United States Patent
Souders et al.

(10) Patent No.: US 7,805,545 B2
(45) Date of Patent: *Sep. 28, 2010

(54) METHOD FOR IMPLEMENTING A CONTROL CHANNEL IN A SYSTEM OF CIRCUMVENTION AND RECOVERY

(75) Inventors: Keith A. Souders, Tampa, FL (US); Jamal Haque, Tampa, FL (US); James E. Lafferty, St. Petersburg, FL (US); Edward R. Prado, Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 264 days.

This patent is subject to a terminal disclaimer.

(21) Appl. No.: 11/672,056

(22) Filed: Feb. 7, 2007

(65) Prior Publication Data

US 2008/0189448 A1  Aug. 7, 2008

(51) Int. Cl.
G06F 3/00 (2006.01)
G06F 11/00 (2006.01)
G05B 19/18 (2006.01)
G05B 9/02 (2006.01)

(52) U.S. Cl. .............. 710/15; 700/2; 700/79; 714/2; 714/31; 714/43

(58) Field of Classification Search ........... 710/15; 700/2, 79; 714/2, 31, 43
See application file for complete search history.

(56) References Cited

U.S. PATENT DOCUMENTS

| | | | | |
|---|---|---|---|---|
| 4,413,327 A | * | 11/1983 | Sabo et al. | 711/162 |
| 5,317,441 A | * | 5/1994 | Sidman | 398/41 |
| 5,786,975 A | * | 7/1998 | Duncan et al. | 361/111 |
| 5,923,830 A | | 7/1999 | Fuchs et al. | |
| 6,141,770 A | * | 10/2000 | Fuchs et al. | 714/11 |
| 6,330,627 B1 | * | 12/2001 | Toda | 710/104 |
| 6,388,259 B1 | | 5/2002 | Murdock | |
| 6,401,159 B1 | * | 6/2002 | Wang | 710/315 |
| 6,424,177 B1 | * | 7/2002 | Hairapetian | 326/86 |
| 6,526,559 B2 | | 2/2003 | Schiefele | |
| 6,799,155 B1 | | 9/2004 | Lindemann et al. | |
| 7,260,742 B2 | * | 8/2007 | Czajkowski | 714/21 |
| 7,343,579 B2 | | 3/2008 | Coxe et al. | |
| 7,428,473 B2 | | 9/2008 | Rodriguez et al. | |

(Continued)

OTHER PUBLICATIONS

Ramos et al. "Enviromentally Adaptive Fault Tolerant Computing (EAFTC)" 2005 IEEE AeroSpace Conference. Mar. 5-12, 2005.*

(Continued)

Primary Examiner—Henry W Tsai
Assistant Examiner—Eric T Oberly
(74) Attorney, Agent, or Firm—Fogg & Powers LLC

(57) ABSTRACT

A multi-function system comprising a plurality of peripherals having different levels of susceptibility to environmental events, at least one event detector configured to detect environmental events, a controller coupled to receive an event detected signal from the at least one event detector, a communication interface communicatively coupling the controller and each peripheral that includes an internal central processing unit, and a dedicated control interface communicatively coupling the controller and the plurality of peripherals. The controller is configured to control circumvention procedures of each peripheral via the dedicated control interface based on the detected event and the level of susceptibility of the peripheral.

18 Claims, 4 Drawing Sheets

U.S. PATENT DOCUMENTS

| | | |
|---|---|---|
| 7,685,464 B2 | 3/2010 | Kimmery |
| 2006/0020774 A1 | 1/2006 | Ramos et al. |
| 2006/0145722 A1 | 7/2006 | Plants |
| 2007/0022318 A1* | 1/2007 | Copenhaver et al. .......... 714/11 |
| 2008/0022152 A1 | 1/2008 | Lupia |
| 2008/0256375 A1 | 10/2008 | Haque et al. |

OTHER PUBLICATIONS

George et al., "SEE Sensitivity Trends in Non-hardened High Density SRAMs with Sub-micron Feature Sizes", Jul. 21, 2003, pp. 83-88, Publisher: IEEE.

Ramos et al , "Environmentally Adaptive Fault Tolerant Computing (EAFTC)", Mar. 2005, Publisher: 2005 IEEE Aerospace Conference.

* cited by examiner

US 7,805,545 B2

METHOD FOR IMPLEMENTING A CONTROL CHANNEL IN A SYSTEM OF CIRCUMVENTION AND RECOVERY

This application is related to U.S. patent applications Ser. No. 11/672,068 having a title of "A SYSTEM OF CIRCUMVENTION AND RECOVERY IN A MULTI-FUNCTION SYSTEM," U.S. patent applications Ser. No. 11/672,065, having a title of "A METHOD OF PERIPHERAL TYPE IDENTIFICATION IN A SYSTEM OF CIRCUMVENTION AND RECOVERY," and U.S. patent applications Ser. No. 11/672,061, having a title of "EXPEDITING RECOVERY FROM A RADIATION EVENT BY ELEVATING HEALTH MONITORING DURING THE EVENT" all of which are filed on the same date herewith. The incorporated herein by reference.

BACKGROUND

Mission application systems that use commercially off the shelf components (COTS) are prone to failure when they experience hostile environments. For example, the performance of a typical COTS processor that is exposed to certain levels of radiation will suffer. To accommodate for the effects of radiation, radiation hardened processors have been developed. The performance of these types of processors is not affected by the radiation. However, radiation hardened processors have their limitations. For example, they tend to be very expensive and they do not perform at a level that can be used in all applications. The lack of performance of radiation hardened processors is especially crucial in mission application systems designed to travel in space where the speed of processing is an issue.

For the reasons stated above and for other reasons stated below which will become apparent to those skilled in the art upon reading and understanding the present specification, there is a need in the art for a system that effectively deals with hostile environments without sacrificing necessary performance to complete a mission.

SUMMARY

A multi-function system comprising a plurality of peripherals having different levels of susceptibility to environmental events, at least one event detector configured to detect environmental events, a controller coupled to receive an event detected signal from the at least one event detector, a communication interface communicatively coupling the controller and each peripheral that includes an internal central processing unit, and a dedicated control interface communicatively coupling the controller and the plurality of peripherals. The controller is configured to control circumvention procedures of each peripheral via the dedicated control interface based on the detected event and the level of susceptibility of the peripheral.

DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide a multi-function system that includes a circumvention and recovery system. The circumvention and recovery system detects disruptive events and employs appropriate safeguards in peripheral equipment that is based on the peripheral's level of susceptibility to a detected event and returns the peripherals to normal operations after the event has finished or has reached a level that is no longer a threat. In one embodiment, a controller employs two processors, an environmentally hardened processor and a high speed processor. The system uses the hardened processor during radiation events and the high speed processor during normal conditions.

Figure 1:
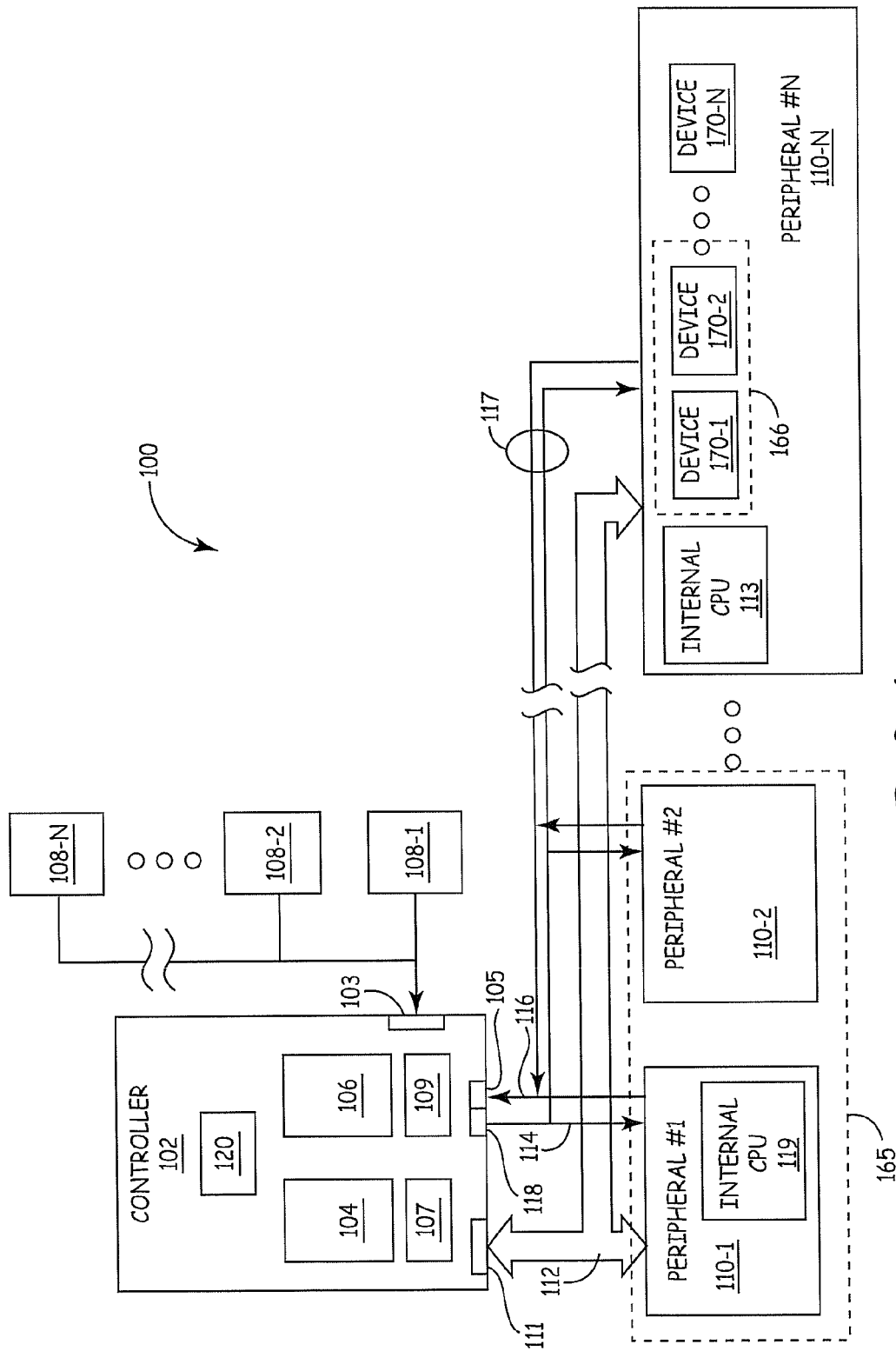
FIG. 1 is a block diagram of a multi-function system having a system of circumvention and recovery of one embodiment of the present invention.

Referring to FIG. 1, a multi-function system 100 of one embodiment of the present invention is illustrated. The multi-function system 100 includes a controller 102, event detectors 108 (1-N), peripherals 110 (1-N), a dedicated control interface 117 that communicatively couples the controller 102 to the plurality of peripherals 110 (1-N). The multi-function system 100 also includes a communication interface 112 that communicatively couples the controller 102 to each peripheral 110 that includes an intelligent communication capability as with a programmed device or internal central processing unit (CPU), such as peripheral 110-1 and 110-N. Peripherals 110-1 and 110-N include internal central processing units 119 and 113, respectively. The communication interface 112 is also referred to herein as "channel 112" or "communication channel 112." In one implementation of this embodiment, the communication interface 112 includes the port 111.

In one implementation of this embodiment, the dedicated control interface 117 includes read peripheral control channel 114 and write peripheral control channel 116 that provide peripheral status control lines. The dedicated control interface 117 is also referred to herein as "channel 114" or "peripheral control write channel 114" and "channel 116" or "peripheral control read channel 116."

In one implementation of this embodiment, the dedicated control interface 117 is shared so that the read peripheral control channel 114 is one line and the write peripheral control channel 116 is one line. In this case, the interface 118 and read peripheral control channel 114 connect to all read interfaces on the peripherals 110 (1-N) while interface 105 and write peripheral control channel 116 connect to all write interfaces on the peripherals 110 (1-N).

In another implementation of this embodiment, the dedicated control interface 117 provides dedicated control to each peripheral 110. In this case, the interface 118 connects separate control lines on read peripheral control channel 114 to each peripheral 110 while interface 105 connects separate write controls lines on write peripheral control channel 116 to each peripheral 110. In both case, the interfaces are either single-ended or differential interfaces.

In yet another implementation of this embodiment, the dedicated control interface 117 provides a combination of shared and dedicated control to subsets of the peripherals 110 (1-N). In this case, dedicated control interface 117 provides dedicated control to some of the peripherals 110 (1-N) while sharing the read peripheral control channel 114 and write peripheral control channel 116 with the remainder of the peripherals 110-(1-N). The interfaces are either single-ended or differential interfaces.

As illustrated in FIG. 1, at least one peripheral 110 comprises a plurality of devices 170 (1-N). The devices 170 (1-N) are shown in peripheral 110-N but others of the peripherals 110 can also have a plurality of devices.

As illustrated in FIG. 1, the controller 102 is in communication with the event detectors 108 (1-N). FIG. 1 illustrates a plurality of event detectors 108 (1-N). In embodiments, one or more event detectors 108 (1-N) are used to detect events, such as radiation. Other types of event detectors are contemplated such as, but not limited to, water detectors, chemical detectors, radiation detectors, vibration detectors, thermal detectors and the like. In fact, any type of detector that detects an event that is detrimental to the performance of the controller 102, the peripherals 110 (1-N) or the channels 112, 114 and 116 can be used. Moreover, different types of event detectors 108 can be used in a single system. That is, event detector 108-1 may be a different type of event detector than 108-2. When an event detector 108 (1-N) detects an event, a signal indicating the detection is communicated to the controller 102 through port 103. Based on the received event signal, the controller 102, controls functions of the peripherals 110 (1-N) for optimal performance during the detected event. Once the event or events are over or determined to no longer be a threat, normal operating fractions are restored by the controller 102. In one embodiment, an end of event is detected by one of the event detectors 108 (1-N) and communicated back to the controller 102. In another embodiment, an event timer 107 is used to determine the end of an event. This embodiment is used when the length of an event can be accurately predicted. Other embodiments, use other commonly know methods of determining the end of an event.

The controller 102 in the embodiment of FIG. 1 has a single dedicated clock 120 and two processors, a COTS, relatively high speed processor 104 that is susceptible to events that is used during normal operations and an environmentally hardened processor 106 designed to work even during an event. The relatively high speed processor 104 and the environmentally hardened processor 106 are referred to herein as a central processing unit in the controller 102. The controller 102 will change operation from the COTS processor 104 to the hardened processor 106 based on the detected event. In one embodiment, the environmentally hardened processor 106 is a radiation hardened processor. In one embodiment, the controller 102 includes a memory 109 to store critical information used by the peripheral 110 when the peripheral 110 is shut down. In embodiments of the present invention, the controller 102 applies predefined or dynamic safeguards to the peripherals 110 (1-N) based on the peripheral's ability to withstand the detected event. Hence the susceptibility of each peripheral 110 is used to determine the safeguards that are implemented on the peripheral 110. Once the event is determined to no longer be a threat, the controller 102 returns each peripheral 110 back to full function.

The dedicated control interface 117 is configured to place the peripherals 110 in safe mode. As defined herein, safe mode comprises talking an action to prevent damage to the peripheral 110 during the event and to prevent loss of data during the event. For example, safe mode includes powering down all the peripherals 110(1-N), powering down a subset 165 of the peripherals 110 (1-N), putting all the peripherals 110 (1-N) into standby mode, putting a subset 165 of the peripherals 110 (1-N) into standby mode, powering down all the devices 170 (1-N) in at least one peripheral (such as 110-N), powering down a subset 166 of the devices 170(1-N) in at least one peripheral 110, putting all the devices 170 in at least one peripheral 110 into standby mode, putting a subset 166 of the devices 170 (1-N) in at least one peripheral 110 into standby mode, and combinations thereof. The exemplary subset 165 of peripherals 110 (1-N) shown in FIG. 1 includes peripherals 110-1 and 100-2. The exemplary subset 166 of devices 170 (1-N) shown in FIG. 1 includes devices 170-1 and 170-2.

Standby mode is also referred to as sleep mode, hibernation, warm shutdown. In one implementation of this embodiment during standby mode, the device 170 or peripheral 110 is not completely powered down, but the device 170 or peripheral 110 is placed in a mode of reduced or minimum functionality. In another implementation of this embodiment during standby mode, the functionality of the peripheral is at some reduced level of activity. In yet another implementation of this embodiment, during standby mode, power to the peripheral 110 is reduced to a level capable of maintaining the minimum life functions.

Each device 170 is selected to be in a subset 166 of devices 170 (1-N) based on the detected event and the level of susceptibility of the device 170. In an exemplary safe mode for a peripheral 110, a first subset of the devices, such as devices 170-1 to 170-5 are powered down (since devices 170-1 to 170-5 are intolerant to the environmental event) while devices 170-6 to 170-7 are put into standby (since devices 170-6 to 170-7 are somewhat tolerant of the environmental event) and devices 170-8 to 170-N operate normally (since devices 170-8 to 170-N are hardened for the environmental event).

In another implementation of this embodiment, the dedicated control interface 117 is only used to control signals sent to and from the peripherals 110 (1-N). In yet another implementation of this embodiment, the dedicated control interface 117 is only used to control signals sent to and from the peripherals 110 (1-N) during an environmental event.

In embodiments of the present invention the peripherals 110 (1-N) are mixed between peripherals with COTS, peripherals that include all environmentally hardened components and peripherals that include both COTS and environmentally hardened components. Hence, the ability of each peripheral to handle a detected event will vary. As stated above, the controller 102 applies predefined safeguards to the peripheral 110 based on there ability to handle the event detected. The controller 102 is in communication with the peripherals 110 via peripheral control read channel 116 and a peripheral control write channel 114 through respective ports 105 and 118. In one embodiment, enable/disable signals are communicated across the control write lines 114. Verification of the enable/disable signals are communicated across the control read lines 116. In one embodiment, the controller 102 controls the peripherals 110 individually. In another embodiment, the controller 102 controls similar peripherals 110 simultaneously.

Communication channel 112 is used to communicate between the controller 102 and peripherals 110 that have CPU's or other means of responsive communication, such as peripherals 110-1 and 110-N via port 111. As illustrated, peripherals 110-1 and 110-N include CPU's 119 and 113, respectfully. The communication channel 112 allows for the communication with and control of the respective CPU 119 and 113 by the controller 102. If the CPU 119 and/or 113 are to be shut down as the result of a detected event, vital data is stored in memory 109 of controller 102 during the shut down. When the event is over, the stored vital data is retrieved and sent back to the respective CPU 119 and 113.

In one embodiment of the present invention, peripherals with CPU's 119 and 113 that are performing vital functions during a detected event are allowed to continue while they are functioning properly. In this embodiment the controller 102 repeatedly monitors the respective CPU 119 and 113 to ensure it is functioning properly. If it performs becomes effected, the peripheral is shut down. Monitoring the health of a CPU during an event is further described in the commonly assigned application having the Ser. No. 11/672,061 herein filed on the same day and incorporated herein by reference.

In one implementation of this embodiment, the communication interface 112 includes a single dedicated clock 120 in the controller 102. In another implementation of this embodiment, the communication interface 112 includes a dedicated transmit clock in the controller and a dedicated receive clock in the controller both indicated by clock 120 in FIG. 1. In yet another implementation of this embodiment, the communication interface 112 a single bi-directional data line that is implemented in a shared-full-duplex-serial interface. The shared-full-duplex-serial interface is configured for one of a plurality of possible formats. The possible formats include: a polled request-and-grant format implemented in a single-ended technology; a polled request-and-grant format implemented in a differential technology; a time-multiplexed format implemented in a single-ended technology; a time-multiplexed format implemented in a differential technology; a statistical-multiplexed format implemented in a single-ended technology; a statistical-multiplexed format implemented in a differential technology; and combinations thereof.

A single-ended technology is a single line, wire, or trace connecting a first point with a second point in circuit. An exemplary single-ended technology includes the RS232 specification that allows for data transmission from one transmitter to one receiver at relatively slow data rates (up to 20 K bits/second) and short distances (up to 50 feet at the maximum data rate). Independent channels are established for two-way (full-duplex) communications. RS423 is another single ended specification with enhanced operation over RS232.

A differential technology is implemented in place of a single-ended technology when the multi-function system 100 is communicating at high data rates or over long distances. Differential data transmission (balanced differential signal) offers performance superior to single-ended transmission in most applications. Differential signals help to nullify the effects of ground shifts and induced noise signals that can appear as common mode voltages on a network. An exemplary differential technology includes RS422 that is designed for greater distances and higher baud rates than RS232. In its simplest form, a pair of converters from RS232 to RS422 (and back again) can be used to form an "RS232 extension cord."

Data rates of up to 100 K bits/second and distances up to 4000 feet can be accommodated with RS422. RS422 is also specified for multi-drop (party-line) applications where only one driver is connected to, and transmits on a bus of up to 10 receivers. In this case, the communication interface 112 comprises the bus in the multi-drop application.

In one implementation of this embodiment, the communication interface 112 a single bi-directional data line that is implemented in a dedicated-full-duplex-serial interface. The dedicated-full-duplex-serial interface is configured for one of the plurality of possible formats described above.

In another implementation of this embodiment, communication interface 112 comprises a shared-full-duplex-parallel interface 112. The shared-full-duplex-parallel interface 112 includes dedicated bi-directional data lines. The shared-full-duplex-serial interface is configured for one of the plurality of possible formats described above. In one implementation of this embodiment, the shared-full-duplex-parallel interface transceives (i.e., transmits and receives) a number of parallel signals. The number of parallel signals equals $2^n$, wherein n is an integer.

In one implementation of this embodiment, the dedicated control interface 117 sends a plurality of chip-select controls from the hardened processor 106 to the peripherals 110 responsive to a detected event. In another implementation of this embodiment, the dedicated control interface 117 sends a plurality of output-enable controls from the hardened processor 106 to the peripherals 110 responsive to a detected event. In yet another implementation of this embodiment, the dedicated control interface 117 sends a plurality of chip select controls and a plurality of output enable controls from the hardened processor 106 to the peripherals 110 responsive to a detected event.

Figure 2:
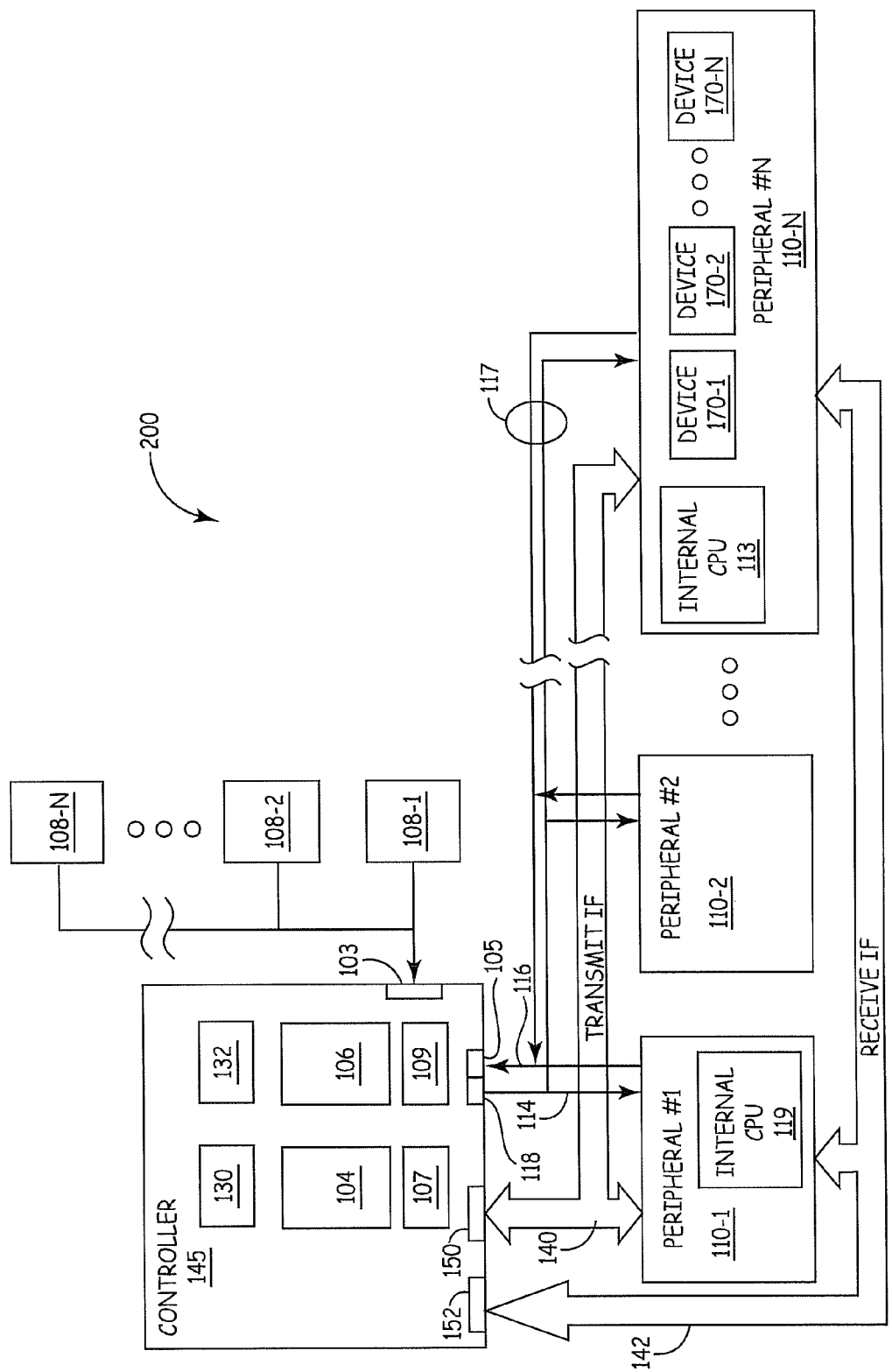
FIG. 2 is a block diagram of a multi-function system having a system of circumvention and recovery of one embodiment of the present invention.

Referring to FIG. 2, a multi-function system 200 of one embodiment of the present invention is illustrated. The multi-function system 200 is similar in function to multi-function system 100 described above with reference to FIG. 1. The multi-function system 200 differs in structure from the multi-function system 100 in that the transmit clock 130 and the receive clock 132 replace the single dedicated clock 120 and the communication interfaces 140 and 142 replace communication interface 112. In another implementation of this embodiment of multi-function system 200, the controller 145 includes the single dedicated clock 120.

The dedicated control interface 117 communicatively couples the controller 145 to the plurality of peripherals 110 (1-N) as described above with reference to FIG. 1. The communication interface 140 referred to herein as "transmit interface 140" sends communications from the controller 145 to the peripherals 110. The transmit interface 140 uses the transmit clock 130 to schedule communications. The communication interface 142 referred to herein as "receive interface 142" communicatively couples the controller 145 to each peripheral 110 that includes an internal central processing unit, such as peripherals 110-1 and 110-N. The receive interface 142 uses the receive clock 132 to schedule communications.

As illustrated in FIG. 2, the controller 145 is in communication with the event detectors 108 (1-N). The function and structure of the plurality of event detectors 108 (1-N) was described above with reference to FIG. 1.

Transmit interface 140 is used to communicate between the controller 145 and peripherals 110 that have CPU's or other means of responsive communication. Receive interface 142 is used to communicate between the controller 145 and peripherals 110 that have CPU's or other means of responsive communication. As illustrated, peripherals 110-1 and 110-N include internal CPU's 119 and 113, respectfully. Transmit interface 140 and receive interface 142 together function as the communication channel 112 of FIG. 1 to allow for the communication with and control of the respective CPU 119 and 113 by the controller 145. If a CPU 119 and/or 113 is to be shut down as the result of a detected event, vital data is stored in memory 109 of controller 145 during the shut down. When the event is over, the stored vital data is retrieved and sent back to the respective CPU 119 and 113.

In one implementation of this embodiment, the transmit interface 140 and receive interface 142 are each a single bi-directional data line that is implemented in a shared-half-duplex-serial interface. The shared-half-duplex-serial interface is configured for one of a plurality of possible formats as described above with reference to FIG. 1 and may be single-ended or differential technologies.

In one implementation of this embodiment, the transmit interface 140 and receive interface 142 are each a single bi-directional data line that is implemented in a dedicated-half-duplex-serial interface. The dedicated-half-duplex-serial interface is configured for one of a plurality of possible formats as described above with reference to FIG. 1 and may be single-ended or differential technologies.

Figure 3:
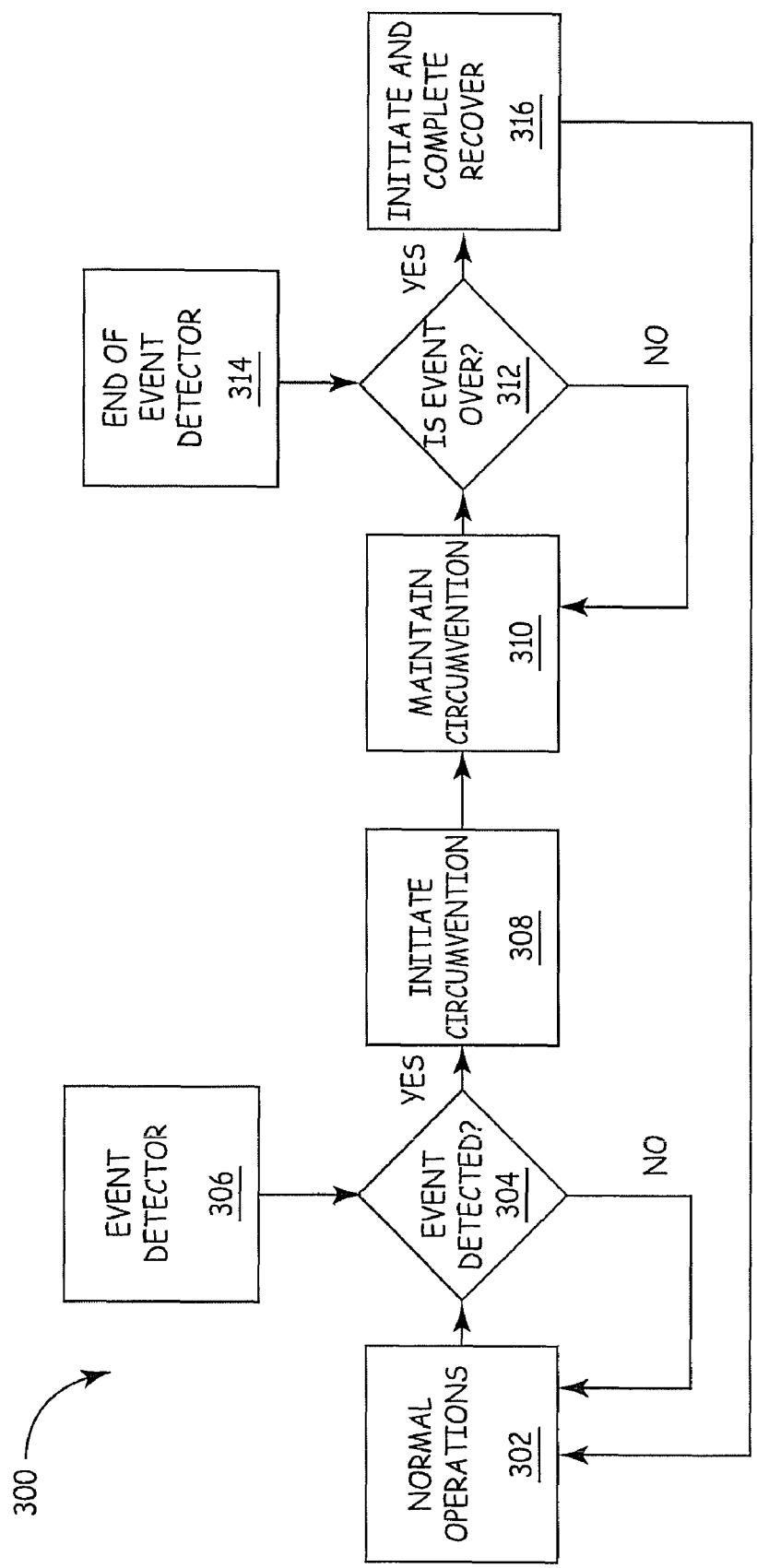
FIG. 3 is a circumvention flow diagram of one embodiment of the present invention.

FIG. 3 illustrates a circumvention flow diagram 300 of one embodiment of the present invention. As illustrated, the diagram 300 starts in normal operations at step (302). An event detector 206 is used to detect events. As discussed above, the event detector 206 can be any type of detector configured to detect an event that could hamper the function of the system. If no event is detected by the event detector 206 at step 304, normal operations are continued at step (302). If, however, an event is detected at step 304, an initiate circumvention step (308) occurs. During this step (308), as discussed above, the controller directs each peripheral in the system to take circumvention steps according to the level of threat posed by the event and the ability of the peripheral to withstand the event. The circumvention is maintained at step (310). An end of event detector 314 is used to determine if the event is over. As discussed above, the end of event detector may be the same or another event detector that is polled, a timer or any other device known in the art to detect the end of an event. If it is determined that the event is not over at step (311), the circumvention is maintained. If it is determined that the event is over at step (312), recovery to normal operations is initiated and completed at step (316).

Figure 4:
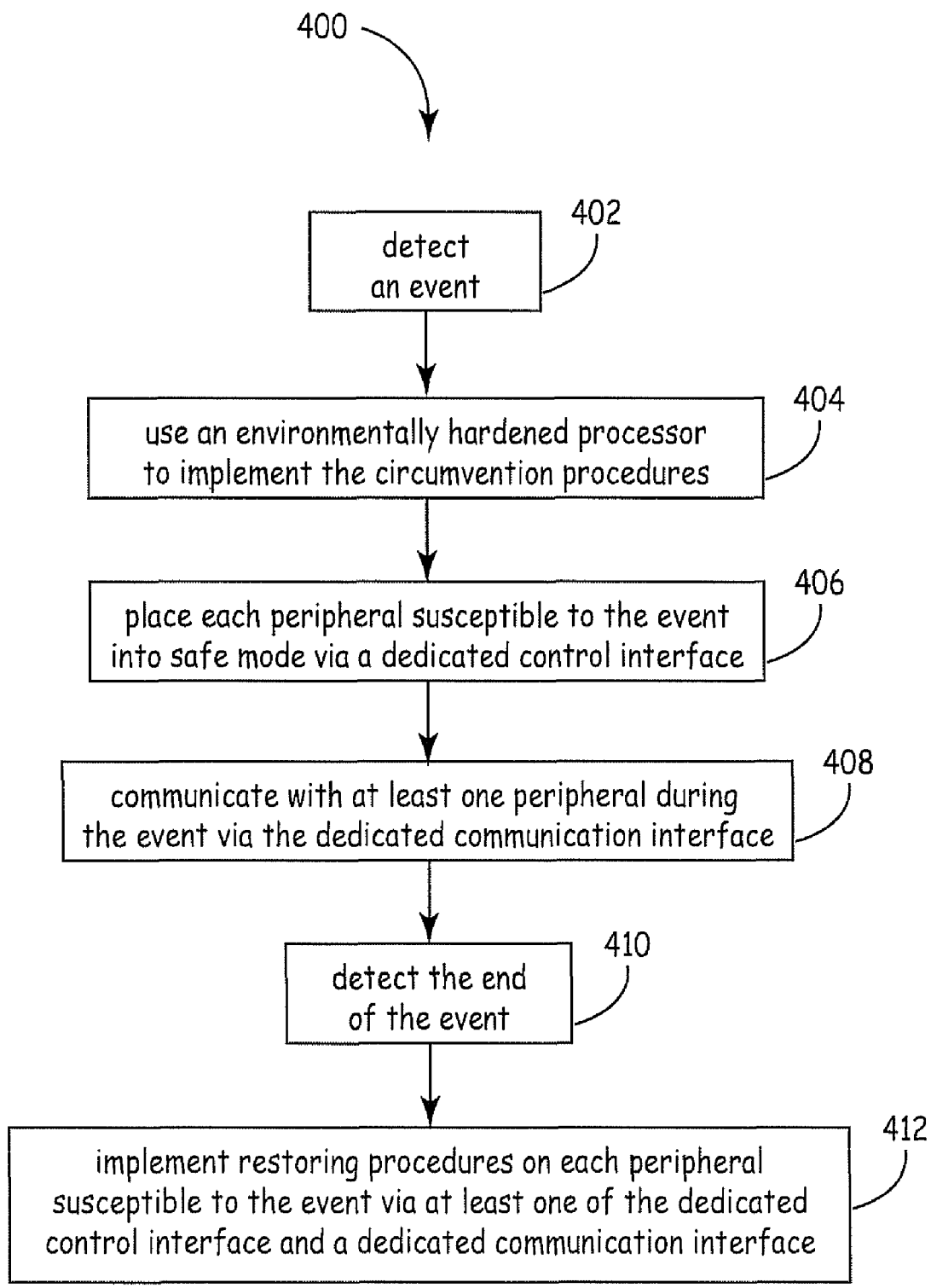
FIG. 4 is a flow diagram of one embodiment of a method to operate a multi-function system in accordance with the present invention.

FIG. 4 is a flow diagram of one embodiment of a method 400 to operate a multi-function system in accordance with the present invention. The method 400 is described with reference to system 100 of FIG. 1. As illustrated, the diagram 400 starts by detecting an event (402). In one implementation of this embodiment, at least one event detector 108 detects the event. In another implementation of this embodiment, the event is a high level of radiation event and not all the peripherals 110 are radiation hardened. In another implementation of this embodiment, the event is an event that can cause damage to one or more of the peripherals 110. The environmentally hardened processor implements the circumvention procedures (404). In one implementation of this embodiment, the environmentally hardened processor 106 designed to work even during an event implements the circumvention procedures.

The environmentally hardened processor places each peripheral that is susceptible to the event into safe mode via a dedicated control interface (406). In one implementation of this embodiment, the environmentally hardened processor 106 places each peripheral 110 that is susceptible to the event into safe mode via a dedicated control interface 117.

The environmentally hardened processor communicates with at least one peripheral during the event via the dedicated communication interface (408). The dedicated communication interface communicatively couples the environmentally hardened processor to the peripherals that have internal central processing units. In one implementation of this embodiment, the environmentally hardened processor 106 communicates with at least one peripheral 110 during the event via the dedicated communication interface 112. In another implementation of this embodiment, the environmentally hardened processor 106 communicates with at least one peripheral 110 during the event via the dedicated communication interfaces 140 and 142.

An end of event detector detects the end of the event when the event is over (410). As discussed above, the end of event detector may be the same or another event detector that is polled, a timer or any other device known in the art to detect the end of an event.

The controller implements restoring procedures on each peripheral susceptible to the event via at least one of the dedicated control interface and a dedicated communication interface (412). In one implementation of this embodiment, controller 102 implements restoring procedures on each peripheral 110 susceptible to the event via at least one of the dedicated control interface 117 and a dedicated communication interface 112. In another implementation of this embodiment, controller 102 implements restoring procedures on each peripheral 110 susceptible to the event via at least one of the dedicated control interface 117 and the dedicated communication interfaces 140 and 142.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A multi-function system comprising:
   a plurality of peripherals having different levels of susceptibility to environmental events;
   at least one event detector configured to detect environmental events, wherein the at least one event detector includes one or more of a water detector, a chemical detector, a radiation detector, a vibration detector, and a thermal detector;
   a controller coupled to receive an event detected signal from the at least one event detector, the controller including a processor that is susceptible to environmental events for use during normal operations and an environmentally hardened processor for use during an environmental event;
   a communication interface communicatively coupling the controller to only those peripherals that include an intelligent communication capability; and
   a dedicated control interface communicatively coupling the controller to each peripheral in the plurality of peripherals, wherein the controller directs each peripheral in the system to take circumvention steps according to the level of threat posed by the environmental event and the ability of the peripheral to withstand the environmental event via the dedicated control interface.

2. The system of claim 1, wherein the communication interface comprises a single dedicated clock in the controller.

3. The system of claim 1, wherein the communication interface comprises a dedicated transmit clock in the controller and a dedicated receive clock in the controller.

4. The system of claim 1, wherein the communication interface comprises a shared-full-duplex-serial interface, the shared-full-duplex-serial interface comprising a single bi-directional data line.

5. The system of claim 4, wherein the shared-full-duplex-serial interface is configured for one of a polled request-and-grant format implemented in a single-ended technology, a polled request-and-grant format implemented in a differential technology, a time-multiplexed format implemented in a single-ended technology, a time-multiplexed format implemented in a differential technology, a statistical-multiplexed format implemented in a single-ended technology, a statistical-multiplexed format implemented in a differential technology, and combinations thereof.

6. The system of claim 1, wherein the communication interface comprises a shared-half-duplex-serial interface, the shared-half-duplex-serial interface comprising:
   a single data line for transmit; and
   a single data line for receive.

7. The system of claim 6, wherein the shared-half-duplex-serial interface is configured for one of a polled request-and-grant format implemented in a single-ended technology, a polled request-and-grant format implemented in a differential technology, a time-multiplexed format implemented in a single-ended technology, a time-multiplexed format implemented in a differential technology, a statistical-multiplexed format implemented in a single-ended technology, a statistical-multiplexed format implemented in a differential technology, and combinations thereof.

8. The system of claim 1, wherein the communication interface comprises a dedicated-full-duplex-serial interface, the dedicated-full-duplex-serial interface comprising
   a single bi-directional data line communicatively coupled between a central processing unit in the controller and the intelligent communication capability in each peripheral having an intelligent communication capability.

9. The system of claim 8, wherein the dedicated-full-duplex-serial interface is configured for one of a polled request-and-grant format implemented in a single-ended technology, a polled request-and-grant format implemented in a differential technology, a time-multiplexed format implemented in a single-ended technology, a time-multiplexed format implemented in a differential technology, a statistical-multiplexed format implemented in a single-ended technology, a statistical-multiplexed format implemented in a differential technology, and combinations thereof.

10. The system of claim 1, wherein the communication interface comprises a dedicated-half-duplex-serial interface, the dedicated-half-duplex-serial interface comprising a single data line for receive communicatively coupled between a central processing unit in the controller and the intelligent communication capability in each peripheral having an intelligent communication capability; and
   a single data line for transmit communicatively coupled between the central processing unit in the controller and intelligent communication capability in each peripheral having the intelligent communication capability.

11. The system of claim 10, wherein the dedicated-half-duplex-serial interface is configured for one of a polled request-and-grant format implemented in a single-ended technology, a polled request-and-grant format implemented in a differential technology, a time-multiplexed format implemented in a single-ended technology, a time-multiplexed format implemented in a differential technology, a statistical-multiplexed format implemented in a single-ended technology, a statistical-multiplexed format implemented in a differential technology, and combinations thereof.

12. The system of claim 1, wherein the communication interface comprises a shared-full-duplex-parallel interface, the shared-full-duplex-parallel interface comprising data lines.

13. The system of claim 12, wherein the shared-full-duplex-parallel interface is configured for one of a polled request-and-grant format implemented in a single-ended technology, a polled request-and-grant format implemented in a differential technology, a time-multiplexed format implemented in a single-ended technology, a time-multiplexed format implemented in a differential technology, a statistical-multiplexed format implemented in a single-ended technology, a statistical-multiplexed format implemented in a differential technology, and combinations thereof.

14. The system of claim 12, wherein the shared-full-duplex-parallel interface transceives a number of parallel signals that equals $2^n$ parallel signals, wherein n is a positive integer.

15. The system of claim 1, wherein at least one peripheral comprises a plurality of devices, wherein the control interface is configured to place the peripherals in safe mode, and wherein safe mode comprises one of powering down all the peripherals, powering down a subset of the peripherals, putting all the peripherals into standby mode, putting a subset of the peripherals into standby mode, powering down all the devices in at least one peripheral, powering down a subset of the devices in at least one peripheral, putting all the devices in at least one peripheral into standby mode, putting a subset of the devices in at least one peripheral into standby mode, and combinations thereof, wherein a device is selected to be in a subset of devices, based on the detected environmental event and the level of susceptibility of the device.

16. A method of operating a multi-function system having a plurality of peripherals having various levels of susceptibility to environmental events, the method comprising:
   detecting an environmental event by at least one event detector, wherein detecting an environmental event by at least one event detector comprises detecting an environmental event by one or more or a water detector, a chemical detector, a radiation detector, a vibration detector, and a thermal detector;
   placing each peripheral susceptible to the environmental event into safe mode at a controller including a processor that is susceptible to environmental events for use during normal operations and an environmentally hardened processor designed for use during an environmental event via a dedicated control interface by directing each peripheral in the system to take circumvention steps according to the level of threat posed by the environmental event and the ability of the peripheral to withstand the environmental event;
   detecting the end of the environment event; and
   implementing restoring procedures on each peripheral susceptible to the environment event via at least one of the dedicated control interface and a dedicated communication interface to restore each peripheral to normal operations after the detection of the end of the environment event.

17. The method of claim 16, further comprising
   communicating with at least one peripheral during the environmental event via the dedicated communication interface, wherein the at least one peripheral includes an intelligent communication capability.

18. A controller for a multi-function system, the controller comprising:

- at least one event signal port configured to receive an event signal from at least one event detector, wherein the at least one event detector includes one or more of a water detector, a chemical detector, a radiation detector, a vibration detector, and a thermal detector;
- a dedicated control read channel port configured to receive signals from a plurality of peripherals via a dedicated control interface;
- a port to communicatively couple the controller to only those peripherals that include an intelligent communication capability;
- a dedicated control write channel port configured to send control signals to the each peripheral in plurality of peripherals via the dedicated control interface;
- at least one dedicated clock for transmit and receive;
- a first processor in communication with the at least one event signal port via a dedicated communication interface, the dedicated control interface, the dedicated control read channel port and the dedicated control write channel port, the first processor configured to process event signals and to generate control signals sent to the peripherals based on received event signals, wherein the control signals implement a circumvention process in each peripheral based on the level of threat posed by an environmental event and the ability of the peripheral to withstand the environmental event and implement a recovery process when the environmental event is over; and
- a second processor, the second processor being environmentally hardened and configured to replace the first processor if it is determined the first processor is susceptible to a detected environmental event.

* * * * *